(12) United States Patent
Waxman

(10) Patent No.: US 8,340,115 B2
(45) Date of Patent: Dec. 25, 2012

(54) APPARATUS AND METHOD FOR COMBINED RATE AND TX ANTENNA SELECTION MECHANISM

(75) Inventor: Shay Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1365 days.

(21) Appl. No.: 11/171,835

(22) Filed: Jun. 29, 2005

(65) Prior Publication Data

US 2007/0002892 A1    Jan. 4, 2007

(51) Int. Cl.
*H04J 3/16* (2006.01)
(52) U.S. Cl. .......................... 370/437; 370/465
(58) Field of Classification Search .............. 370/465, 370/437, 235, 229, 230, 233, 234, 436; 375/349; 455/562, 550, 69, 279.1
See application file for complete search history.

(56) References Cited

U.S. PATENT DOCUMENTS

| | | | | |
|---|---|---|---|---|
| 6,072,807 A | * | 6/2000 | Daudelin | 370/465 |
| 6,498,939 B1 | * | 12/2002 | Thomas | 455/562.1 |
| 6,671,499 B1 | * | 12/2003 | Ylitalo et al. | 455/101 |
| 6,714,769 B2 | * | 3/2004 | Kazakevich et al. | 455/101 |
| 2002/0077140 A1 | * | 6/2002 | Monogioudis et al. | 455/522 |
| 2005/0245298 A1 | * | 11/2005 | Mori | 455/575.7 |
| 2010/0091749 A1 | * | 4/2010 | Kish et al. | 370/338 |

OTHER PUBLICATIONS

Rectification for Block Ack Setup Procedures by Isaac Lim Wei Lih Nov. 11, 2003.*

* cited by examiner

*Primary Examiner* — Kibrom T Hailu
*Assistant Examiner* — Dady Chery
(74) *Attorney, Agent, or Firm* — Blakely, Sokoloff, Taylor & Zafman LLP

(57) ABSTRACT

A method and apparatus for a combined rate and transmission (TX) antenna selection mechanism are described. In one embodiment, the method includes switching between TX antenna combination during a high throughput (HTP) burst transmission of, for example, a physical layer (PHY) aggregated packet. In one embodiment, switching between TX antenna pairs of various combinations of two out of three antennas is performed during the HTP burst transmission. Following the HTP burst transmission, in one embodiment, a block acknowledgement (ACK) is received regarding the HTP burst transmission. In one embodiment, the block ACK is analyzed to select a TX antenna combination. In one embodiment, a TX antenna combination having a lowest packet error rate (PER) is selected according to the block ACK. Other embodiments are described and claimed.

22 Claims, 6 Drawing Sheets

APPARATUS AND METHOD FOR COMBINED RATE AND TX ANTENNA SELECTION MECHANISM

FIELD

One or more embodiments relate generally to the field of wireless communications. More particularly, one or more of the embodiments relate to a method and apparatus for combined rate and transmission (TX) antenna selection mechanism.

BACKGROUND

A wireless local area network (WLAN) is a flexible data communications system that can either replace or extend a wired LAN to provide additional functionality. Using radio frequency (RF) technology, WLANs transmit and receive data over the air, through walls, ceilings and even cement structures without wired cabling. A WLAN provides all the features and benefits of traditional LAN technology, such as Ethernet and token ring, but without the limitation of being tethered together by a cable. This provides greater freedom and increased flexibility.

A WLAN is a network in which a mobile user can connect to a LAN through a RF connection. The Institute of Electrical and Electronic Engineers (IEEE) 802.11 Standard (e.g., IEEE Std. 802.11-1997, 802.11a, 802.11.e, 802.11n, etc.) specify technologies for WLANs. There are several technologies for WLANs including 802.11 Standard, Hyper LAN 2 and future potential standards for any point-to-point wireless link or network. Accordingly, high bandwidth allocation for WLANs provides a solution for implementing a network within structures at a relatively low cost without having to wire such structures to implement the network.

Wireless devices that operate according to an IEEE 802.11 Standard include two main parts: 1) a physical layer (PHY) signaling control device; and 2) a medium access control (MAC) device. The function of the PHY device is to transfer data packets over an RF interface. Among other things, the function of the MAC is to fairly control access to the shared RF interface.

The minimal MAC protocol consists of two frames, (1) a frame sent from a transmitter to a receiver; and (2) an acknowledge (ACK) from the receiver that the frame was received correctly, referred to herein as a "single packet transmission mode." If a transmitter has multiple packets to send to the receiver, some versions of the 802.11 standard require the transmitter to wait for an ACK after the transmission of each packet. In addition, the transmitter must wait for a particular time interval, referred to as the "inter-frame space" (IFS), after receiving the ACK and before transmitting the next packet.

The 802.11 Task Group N (TGn) was designed with the goal of increasing the peak throughput of 802.11 WLANs. TGn's goal is to achieve 100 megabits per second (MBPS) network throughput. One of the modifications for achievement of increasing of the throughput of 802.11 WLAN networks is the use of multiple input, multiple output (MIMO) operations. In accordance with MIMO, the number of transmission and receive antennas used by an 802.11 transceiver may include multiple transmission antennas and multiple receive antennas.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for a combined rate and transmission (TX) antenna selection mechanism are described. In one embodiment, the method includes switching between TX antenna combination during a high throughput (HTP) burst transmission of, for example, a physical layer (PHY) aggregated packet. In one embodiment, switching between TX antenna pairs of various combinations of two out of three antennas is performed during the HTP burst transmission. Following the HTP burst transmission, in one embodiment, a block acknowledgement (ACK) is received regarding the HTP burst transmission. In one embodiment, the block ACK is analyzed to select a TX antenna combination. In one embodiment, a TX antenna combination having a lowest packet error rate (PER) is selected according to the block ACK.

System

Figure 1:
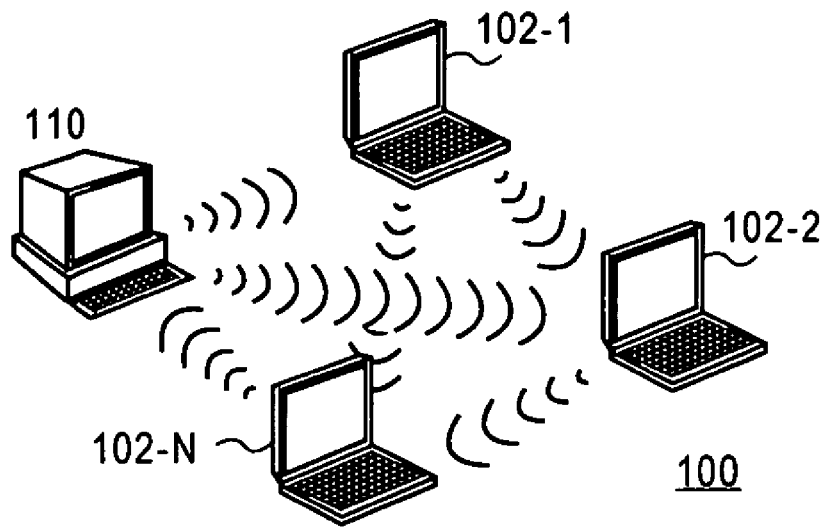
FIG. 1 is a block diagram illustrating a peer-to-peer wireless network configuration for a combined rate and transmission (TX) antenna selection mechanism, in accordance with one embodiment.
Figure 2:
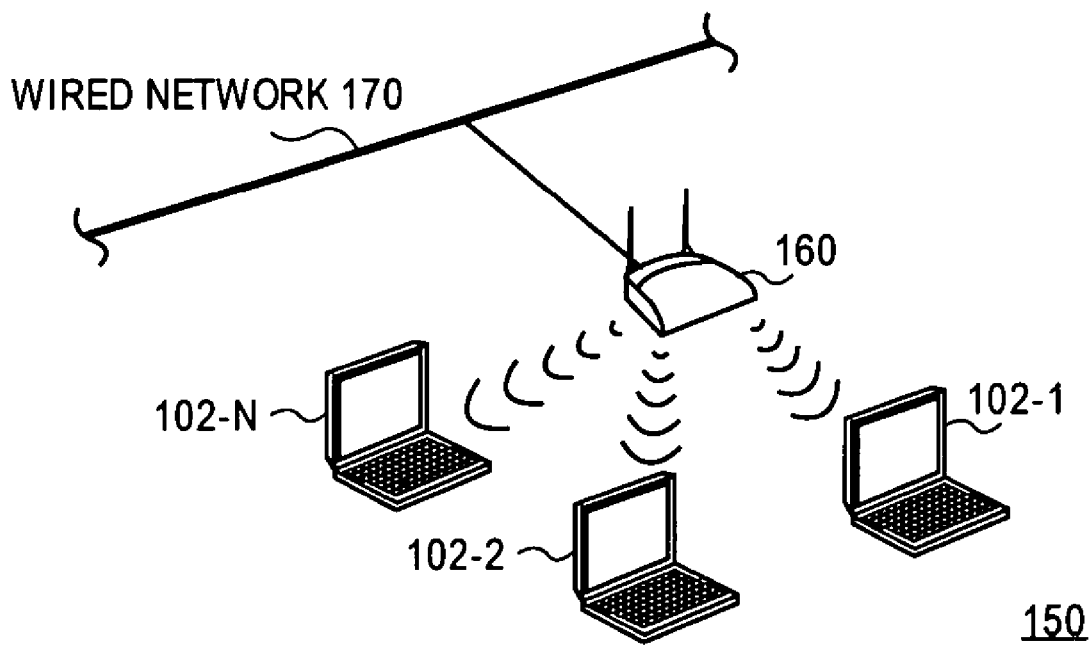
FIG. 2 is a block diagram illustrating a wireless local area network (WLAN) configuration for a combined rate and TX antenna selection mechanism, in accordance with one embodiment.

FIG. 1 is a block diagram illustrating a peer-to-peer configuration for a wireless network 100, in accordance with one embodiment of the invention. FIG. 2 illustrates an infrastructure mode or basic service set (BSS) wireless local area network (WLAN) configuration 150, in accordance with one embodiment. In embodiments depicted in FIGS. 1 and 2, wireless networks 100 and 150 may be configured according to a "wireless protocol" including, but not limited to, IEEE 802.11a, 802.11b, 802.11c, 802.11e, 802.11g, 802.11n, 802.11i, HyperLan 2, or any other protocol for any point-to-point wireless link or network. In one embodiment, wireless clients 102, as shown in FIGS. 1 and 2, are configured to provide a combined rate and TX antenna selection mechanism, according to one embodiment.

As shown in FIG. 1, network 100 is configured according to an ad hoc mode as independent basic service set (IBSS). Representatively, two or more wireless clients 102 (102-1, . . . , 102-N) are equipped with, for example, wireless adapter cards to communicate within wireless network 100. As illustrated in FIG. 2, in the infrastructure mode, each client 102 sends all communications to a WLAN access point (station) 160. As such, the clients 102 communicate with station 160, which acts as a bridge to resources of a wired network 170. Wired network 170 may implement a local area network (LAN) using an Ethernet protocol, Home Plug protocol, or the like.

As described herein, the term "wireless client" or "client" is used to refer to wireless devices including, but not limited to, personal computers including laptop computers, equipped with wireless adapter cards, as well as personal digital assistants (PDAs), appliances, and the like devices configured to communicate via a wireless communications medium such as, for example, radio frequency (RF) waves. Furthermore, as described herein, the term "wireless station" or "station" is used to refer to devices including, but not limited to, wireless base stations, wireless access points (AP), computers such as server computers, personal computers, laptops, PDAs, or like devices configured to restrict access to stored information contained therein or to an attached wired network.

Figure 3:
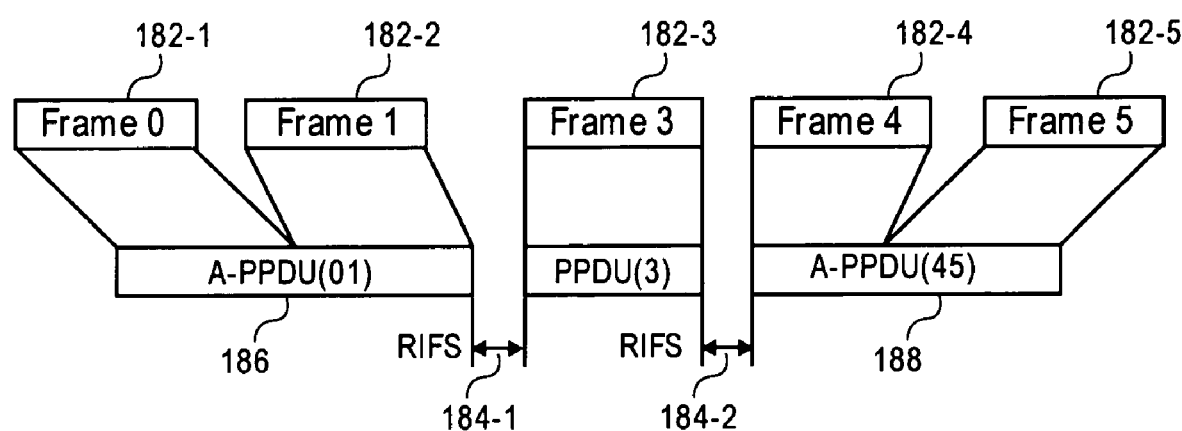
FIG. 3 is a block diagram illustrating a high throughput (HTP) burst transmission to illustrate toggling of TX antenna combinations during a reduced inter-frame space (RIFS), in accordance with one embodiment.

FIG. 3 illustrates a high throughput (HTP) burst transmission 180. In one embodiment, wireless clients 102, as shown in FIGS. 1 and 2, are configured to operate as high throughput (HTP) stations, for example, as described by the "WWiSE Proposal: High Standard Extension to the 802.11 Standard," dated Jan. 6, 2005, referred to herein as the "Standard." In one embodiment, wireless clients ("stations") 102 include an HTP physical layer (PHY), which defines burst transmission formats that permit more efficient usage of a transmission medium. As described herein, an HTP burst transmission includes a sequence of frames 182 (182-1, 182-2, 182-3, 182-4, 182-5) transmitted by a single HTP station, e.g., stations 102 of FIGS. 1 and 2, without transmission of any intervening frames by another station 102.

As shown in FIG. 3, frame zero 182-1 and frame one 182-2 are aggregated into a physical layer convergence procedure (PLCP) protocol data unit (PPDU), referred to herein as "A-PPDU" 186. As illustrated, the various frames 182 may be aggregated into a A-PPDU (184/186) or sent as a single PPDU 182-3. Between the various bursts of frames 182, a reduced inter-frame space (RIFS) 184 (184-1, 184-2) is shown. In one embodiment, stations 102, as shown in FIGS. 1 and 2, operate as HTP stations to enable transmission therebetween using HTP burst transmissions, for example, as illustrated in FIG. 3. In one embodiment, stations 102 include quality of service (QoS) logic to provide rate scaling of the transmissions between the various stations and in one embodiment, provide a transmission (TX) antenna selection mechanism, in accordance with one embodiment, for example, as shown in FIG. 4.

Figure 4:
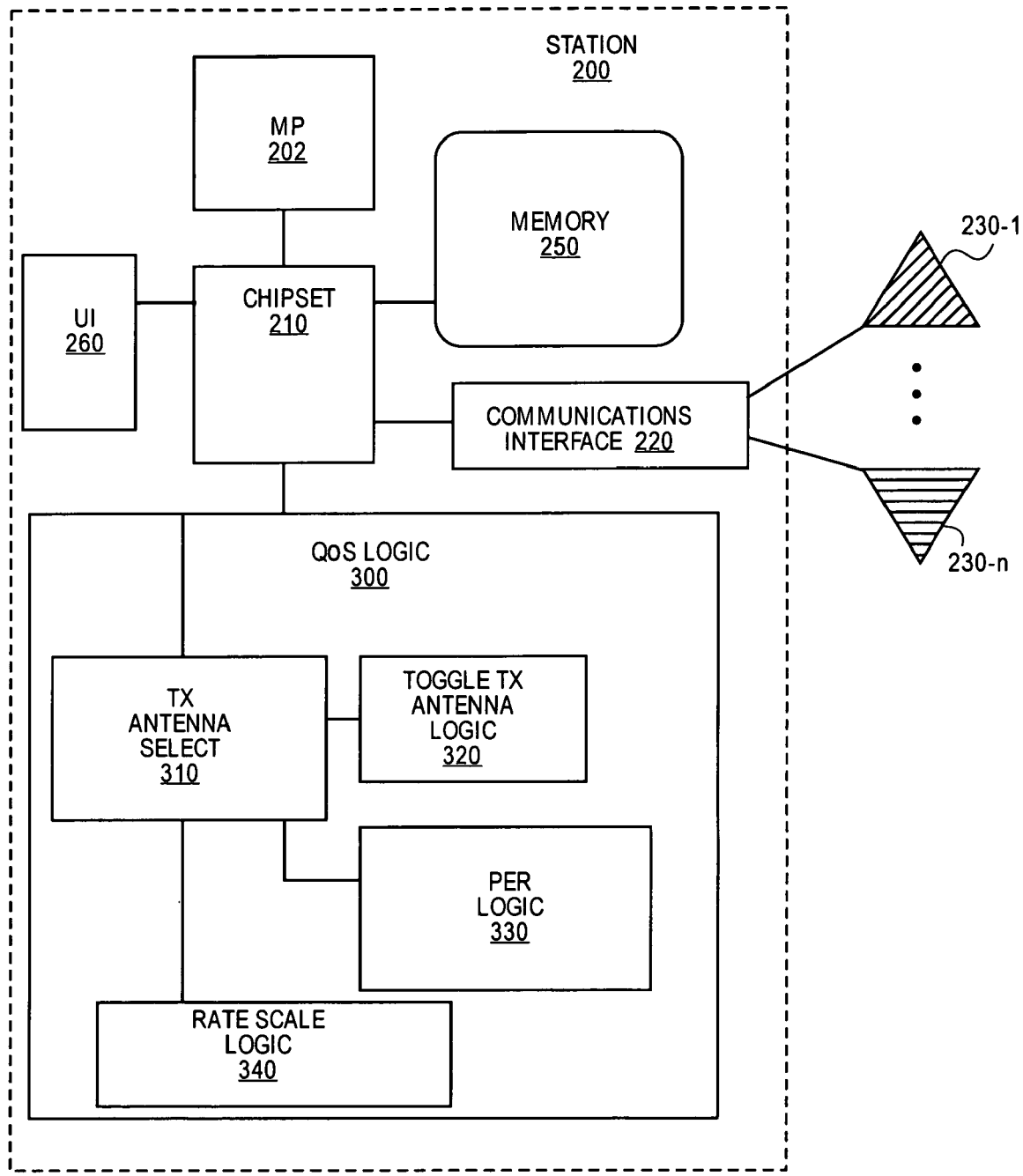
FIG. 4 is a block diagram illustrating a wireless client configuration to provide a combined rate and TX antenna selection mechanism, in accordance with one embodiment.

FIG. 4 is a block diagram illustrating a station 200 to provide a combined TX antenna selection and rate scaling mechanism, in accordance with one embodiment. Representatively, station 200 operates as an HTP station and may include a microprocessor 202, which uses chipset 210 to access memory 250, as well as communications interface 220. As described herein, the term "chipset" is used in a manner well know to those of ordinary skill in the art to describe, collectively, the various devices coupled to CPU 202 to perform desired system functionality.

In one embodiment, communications interface 220 is, for example, a wireless adapter card, which may operate according to a multiple input/multiple output (MIMO) operation. In accordance with such an embodiment, station 200 may include multiple transmit and receive antennas 230 (230-1, . . . , 230-N). Representatively, station 200 provides multiple TX antennas and in one embodiment, includes QoS logic 300 for selecting a TX antenna combination to provide a minimum QoS (quality of service) level. In one embodiment, MAC layer functionality and PHY layer functionality are provided by chipset 210 and QoS logic 300.

Accordingly, in the embodiments illustrated, during communication with wireless stations 102, as shown in FIGS. 1 and 2, station 200, at the direction of QoS logic 300, may desire to alter a TX antenna combination currently used. As described herein, a "TX antenna combination" is provided where M transmission antennas (e.g., 230-1 and 230-2) out of N available TX antennas (e.g., 230-1, 230-2, 230-3) may be used to simultaneously transmit information to a receiver station. For example, in one embodiment, station 200 includes three antennas and uses two out of the three antennas for transmission. In accordance with such an embodiment, the transmission or TX antenna combinations would include transmission using TX antenna combinations 230-1 and 230-2, 230-1 and 230-3, and 230-2 and 230-3, for a total of three TX antenna combinations.

Representatively, TX select logic 310 may direct toggle TX antenna logic 320 to select a TX antenna combination prior to an HTP burst transmission, for example, as shown in FIG. 3. In accordance with one embodiment, for example as shown in FIG. 3, during each RIFS period 184, TX antenna select logic 310 may direct toggle TX antenna logic 320 to switch the current TX antenna combination. In accordance with such an embodiment, the various frames of the HTP burst transmission, for example as shown in FIG. 3, are transmitted with different TX antenna combinations. In an alternative embodiment, RIFS period 184, as shown in FIG. 3, may not be required, such that toggle TX antenna logic 320 may switch the current TX combination during a preamble of the HTP burst. Although illustrated separately from communications interface 220, in one embodiment, portions of QoS logic 300 may be incorporated within communications interface 220 as shown in FIG. 5.

Figure 5:
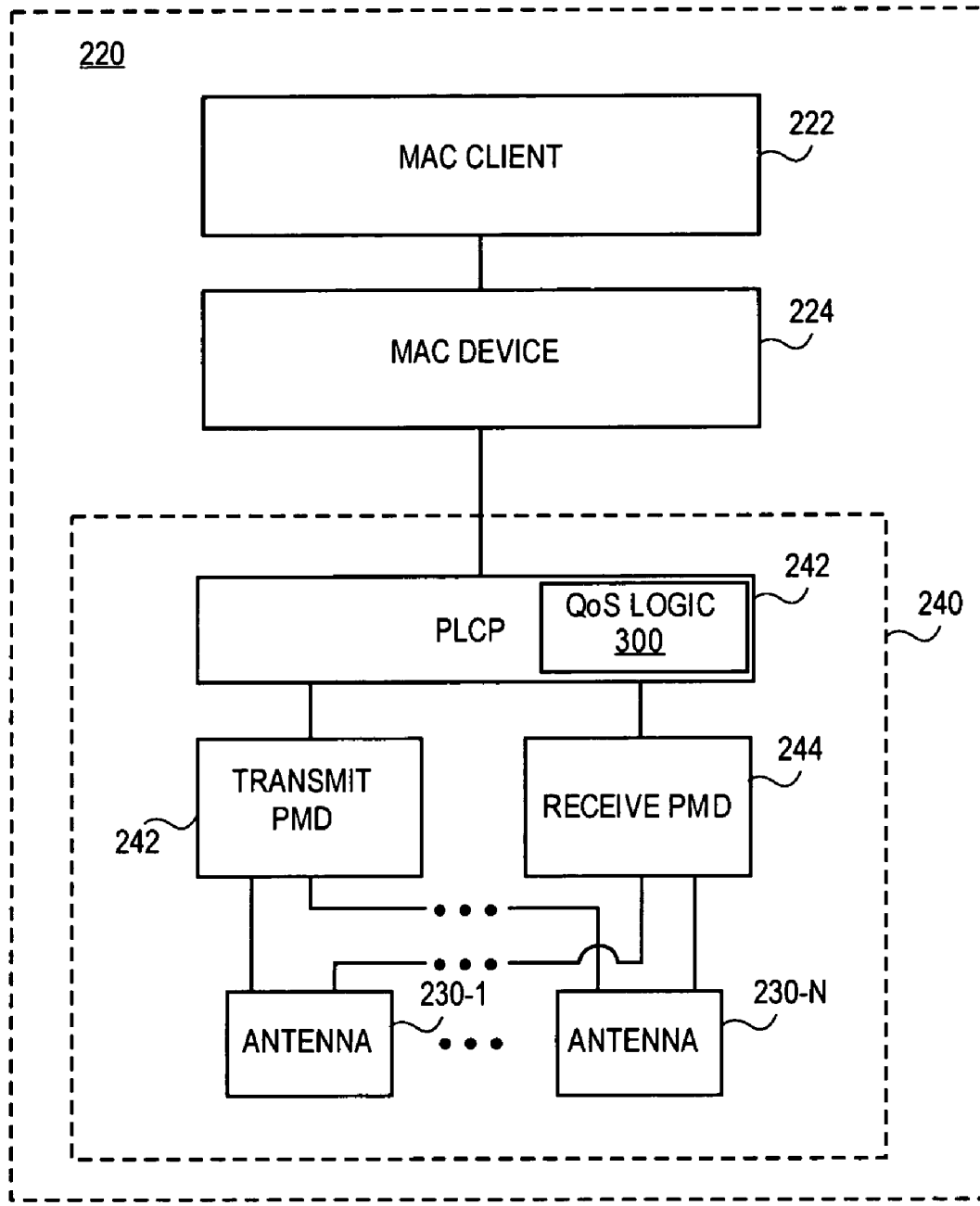
FIG. 5 is a block diagram further illustrating the communications interface of FIG. 4, in accordance with one embodiment.

FIG. 5 is a simplified block diagram further illustrating communications interface 220 (e.g., stations, as shown in FIG. 4) in accordance with one embodiment. Any WLAN station 200 may provide support for IEEE 802.11 Standard by including a physical (PHY) layer signaling control device 240 (PHY device), a medium access control (MAC) device 224, and a MAC client 222. Representatively, communications interface 220 supports station services, which are provided by PHY device 240 and MAC device 224, and used by MAC client 222. These services may include authentication, deauthentication, privacy, and delivery of data.

The MAC client 222 creates and processes data, among other things. The purpose of the PHY and MAC devices 240, 224 is to ensure that two network stations are communicating with the correct frame format and protocol. An IEEE Std. 802.11 defines the communication protocol between the PHY and MAC devices 240, 224.

The function of the PHY device 240 is threefold: 1) to provide a frame exchange between the MAC 224 and PHY 240 under the control of a physical layer convergence procedure (PLCP) sublayer; 2) to transmit data frames over the air interface under the control of the physical medium dependent (PMD) sublayer; and 3) to provide a carrier sense indication back to the MAC 224 so the MAC 224 is able to verify activity on the air interface. In one embodiment, PHY device is modified to provide a combined rate and TX antenna selection mechanism.

In general, the PHY device 240 includes PLCP apparatus 242, and transmit and receive PMD apparatuses 242, 244. Each of these may or may not use some or all of the same physical circuitry (e.g., processors, busses, clocks, storage, etc.). In addition, a plurality of antennas 230 (230-1, . . . , 230-N) may be interconnected with PMD apparatus 242, 244. In one embodiment, the function of transmit PMD apparatus 242 is modified to operate according to QoS logic 300 (FIG.

4) to provide a combined rate and TX antenna selection mechanism. Although illustrated as incorporated within PCP 242, QoS logic may be incorporated within transmit PMD 242 or as a separate component of PHY device 240.

Referring again to FIG. 4, in one embodiment, a block acknowledgement (ACK) mechanism is provided to support HTP burst transmissions where a block ACK is requested (BAR) by station 200 following an HTP burst transmission. In response to such a request, a recipient station would provide a block ACK (BA), which would provide an indication for each frame of the HTP burst transmission that was received.

The BA mechanism aggregates several acknowledgements into one frame. There are two types of block ACK mechanisms: immediate and delayed. Immediate block ACK is suitable for high-bandwidth, low latency traffic while the delayed block ACK is suitable for applications that tolerate moderate latency.

In accordance with one embodiment, packet error rate logic (PER) 330 analyzes the received BA to determine which frames were received by a recipient and which frames were not received by a recipient. In accordance with such an embodiment, PER logic 330 determines a packet error rate or PER for each TX antenna combination. Once determined, in one embodiment, PER logic 330 includes comparison logic (not shown) to select a TX antenna combination having a lowest PER. In accordance with such an embodiment, rate scale logic 330 may also identify the PER of the selected TX antenna combination and either increase or decrease a TX rate according to whether the PER of the selected TX antenna combination is greater than, equal to or less than a previous TX rate.

Figure 6:
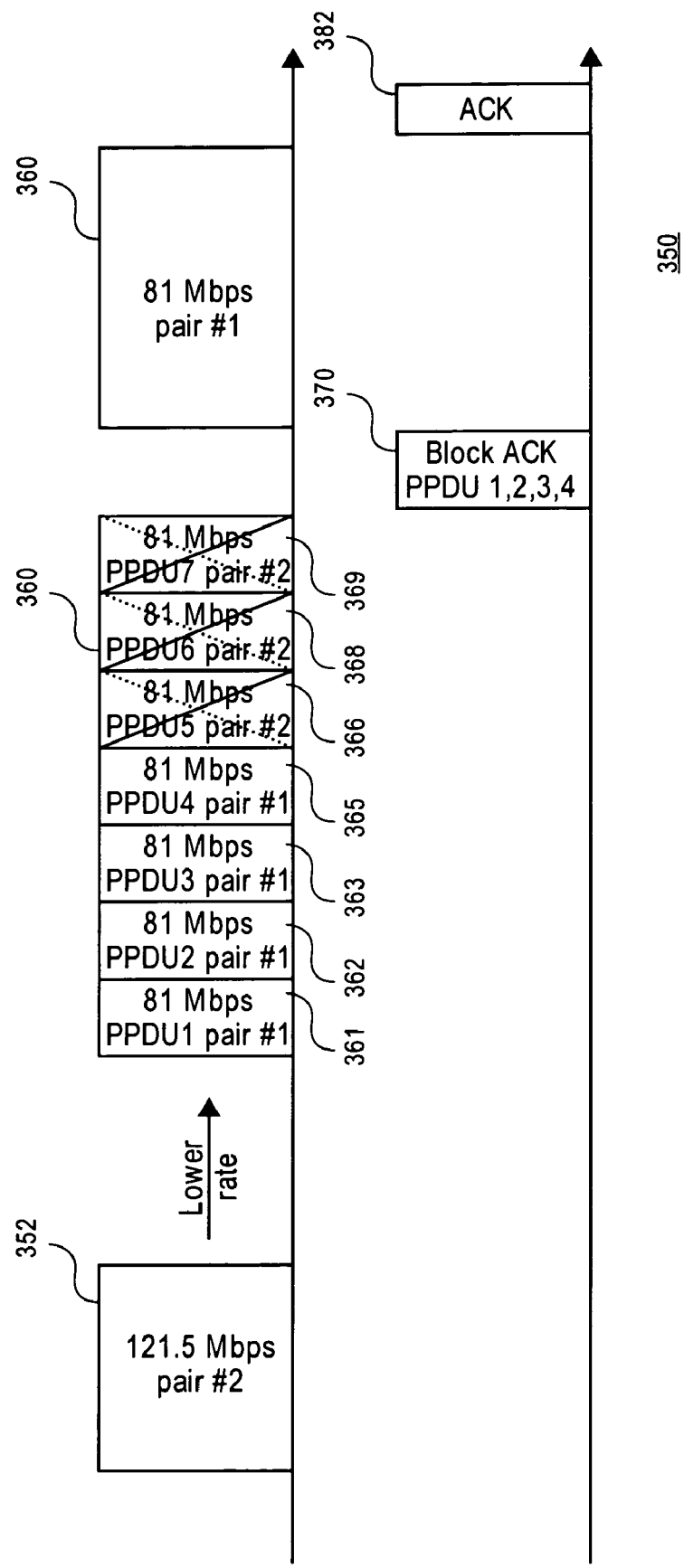
FIG. 6 is a block diagram illustrating an example of the combined transmission antenna selection and rate scaling, in accordance with one embodiment.

For example, as illustrated in FIG. 6, in one embodiment, TX antenna selection and rate scaling is illustrated, in accordance with one embodiment. As shown, data is initially transmitted using TX antenna combination pair two at 121 megabits per second (Mbps) to transmit packet 352, in a single packet transmission mode. In one embodiment, rate scaling is performed to lower a transmission rate to 81 Mbps for HTP burst transmission 360. In accordance with such an embodiment, TX antenna combination one is selected. In accordance with such an embodiment, frames 361, 362, 363 and 364 are transmitted with TX antenna combination one (pair #1).

Once transmitted, frames 366, 368 and 369 are transmitted with TX antenna combination two (pair #2). Following this burst transmission 360, BA 370 is received indicating that only frames transmitted with TX antenna pair one (361, 362, 363 and 364) were received. Accordingly, TX antenna pair one is selected as the TX antenna combination. Representatively, the station begins transmission using single packet transmission mode to transmit packet 380, which requires an ACK 382 for each packet transmission. Procedural methods for implementing embodiments described herein are now provided.

Operation

Figure 7:
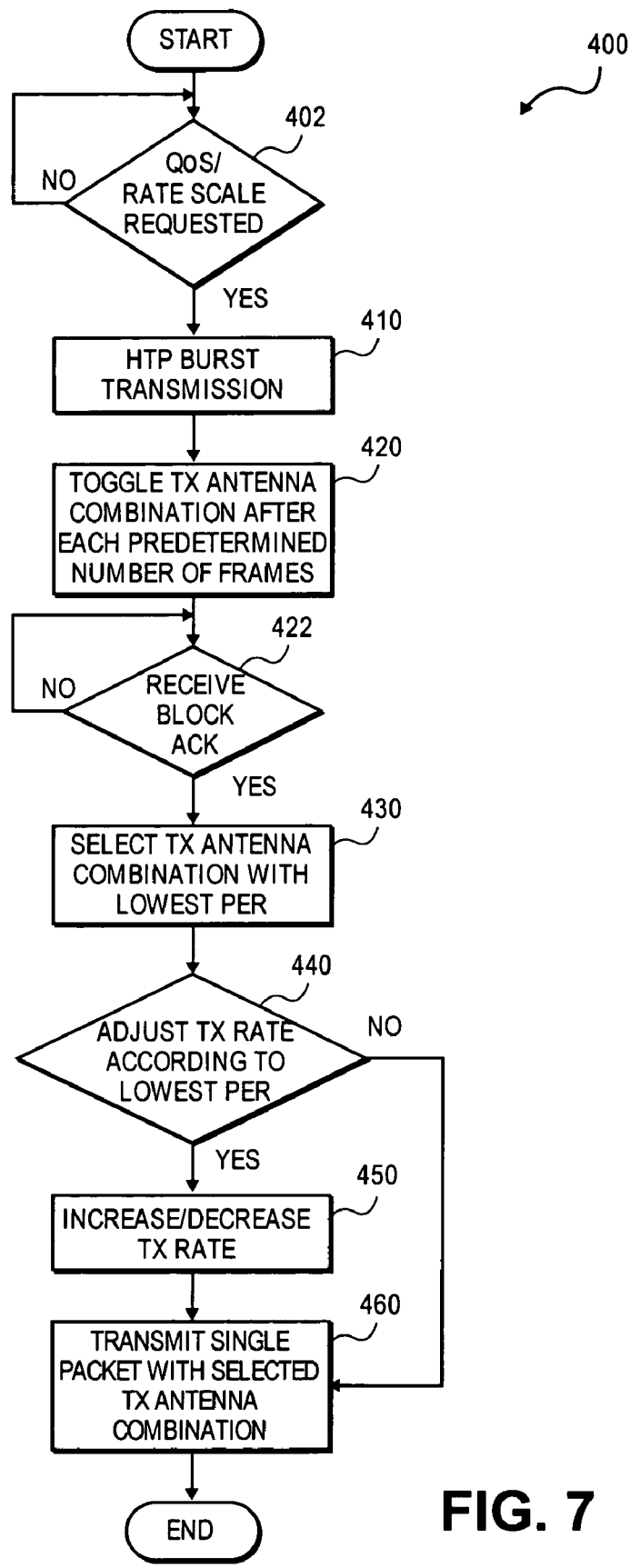
FIG. 7 is a flowchart illustrating a method for a combined rate and TX antenna selection mechanism, in accordance with one embodiment.

Turning now to FIG. 7, the particular methods associated with embodiments of the invention are described in terms of computer software and hardware with reference to a flowchart. The methods to be performed by a computing device (e.g., a wireless station) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flowchart illustrating a method 400 for a combined rate and transmission (TX) antenna selection mechanism, in accordance with one embodiment. In the embodiments described, examples of the described embodiments will be made with reference to FIGS. 1-6. However, the described embodiments should not be limited to the examples provided to limit the scope provided by the appended claims.

Referring again to FIG. 7, at process block 402, it is determined whether a quality of service (QoS) change or rate scaling change is requested. As described herein, a QoS request may include, but is not limited to, a detection that a QoS level required by the respective stations (e.g., for video, audio or other like digital content stream) has fallen below a required QoS level. In one embodiment, such QoS level may be based on a packet error rate of the various communications from the station to a recipient station. In one embodiment, such packet error rate, or bit error rate (BER), may be used to scale the TX rate of the TX station to a recipient station. Once detected, at process block 410, an HTP burst transmission is issued to the recipient station, for example, as illustrated with reference to FIG. 3. At process block 420, a TX antenna combination, is toggled after each predetermined number of frames of the HTP burst transmission. In one embodiment, the TX antenna combination, is toggled after each N-frames of the HTP burst transmission.

In one embodiment, a station, such as, for example, illustrated in FIG. 4, may include three antennas 230-1, 230-2 and 230-3. In such an embodiment, communications interface 220 may use two out of the three transmission antennas to transmit data frames, packets or the like. In accordance with such an embodiment, TX antenna combinations would include combinations using TX antennas 230-1 and 230-2, TX antennas 230-2 and 230-3 and TX antennas 230-1 and 230-3. Accordingly, in the embodiments described, the integer M may be used to refer to the number of TX antennas used for transmission of data and the number or integer N may be used to refer to the total number of antennas available to the station 200, for example, as shown in FIG. 4.

In one embodiment, the station 200 may issue an HTP burst transmission of nine frames. Prior to transmission of the first frame of the HTP burst transmission, the TX antenna select logic 310 may select a TX antenna combination, e.g., TX antennas 230-1 and 230-2. In accordance with such an embodiment, following transmission of, for example, the first three frames, during a reduced inter-frame space (RIFS) (e.g., RIFS 182, as shown in FIG. 3), toggle TX antenna logic 320 may switch to a different TX antenna combination, such as using antennas 230-1 and 230-3. Accordingly, the subsequent three frames are transmitted with the selected TX antenna combination. Following such frames and during a next RIFS, toggle TX antenna logic 320 could switch to TX antenna combinations 230-2 and 230-3 to transmit the final three frames of the HTP burst transmission. In an alternative embodiment, RIFS period 184, as shown in FIG. 3, is not required, such that toggle TX antenna logic 320 may switch the current TX combination during a preamble of the HTP burst.

Referring again to FIG. 7, at process block 422, it is determined whether a block acknowledgement (ACK) is received for the HTP burst transmission. As described above, the block ACK (BA) mechanism enables a transmitting station to receive an ACK, which collectively includes each ACK for each frame transmitted as part of the HTP burst transmission. Once received, at process block 430, a TX antenna combination with the lowest packet error rate (PER) may be selected, for example, by PER logic 330 (FIG. 4). In accordance with such an embodiment, the TX antenna combination, which received the most ACKs and hence has the lowest packet error rate, is selected. However, in alternative embodiments, a bit error rate (BER) or other like mechanism associated with the TX antenna combination may be determined to select a TX antenna combination to provide, for example, a required QoS level.

In accordance with such an embodiment, at process block 440, it is determined whether the transmission, or TX rate, is adjusted according to the lowest PER determined at process block 430. In accordance with such an embodiment, at process block 450, the transmission, or TX rate, may be increased if the PER determined at process block 430 is less than a threshold PER determined during single packet transmission mode. As described above, single packet transmission mode refers to non-HTP burst transmission where stations communicate using the single packet transmission and single ACK transmission for each packet. Referring again to process block 450, the TX rate may be decreased if the PER determined at process block 430 is greater than the threshold PER. Finally, at process block 460, the station may transition to single packet transmission mode with the selected TX antenna combination and the adjusted TX rate.

Existing 802.11a/b/g transceivers do not attempt to perform TX antenna selection for improving performance due to the relatively small gain of the additional diversity. Conversely, TX antenna selection, as performed by, for example, station 200 shown in FIG. 4, which operates according to a multiple input/multiple output (MIMO) configuration, provides a much larger potential performance gain of up to approximately three decibels (dB) when the station has at least two antennas. In one embodiment, station 200, using QoS logic 300, provides a combined TX antenna selection to a unique rate scaling mechanism to create a more efficient channel utilization. As described, during transmission, when picking a higher/lower rate than a current transmission rate, an HTP burst transmission is performed. In parallel, as directed by, for example, QoS logic 300, TX antenna selection logic 310 switches between TX antenna pairs (less than or equal to three times if picking two out of three antennas). In one embodiment, by analyzing the BA pattern, for example, by PER logic 330, the best TX antenna pair can be selected together with a TX rate.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Having disclosed embodiments and the best mode, modifications and variations may be made to the disclosed embodiments while remaining within the scope of the embodiments as defined by the following claims.

What is claimed is:

1. A method comprising:
   switching between N transmission (TX) antenna combinations during a high throughput (HTP) burst transmission, where N is an integer, where the HTP burst transmission aggregates two or more frames as a single data unit;
   analyzing a received block acknowledgement pattern to select a TX antenna combination of M TX antennas, where M is an integer less than N, wherein the block acknowledgement comprises at least one of:
      at least one immediate block acknowledgement message suitable for high-bandwidth, low latency traffic; and
      at least one delayed block acknowledgement message suitable for moderate latency; and
   adjusting a TX rate according to the block acknowledgement received for the HTP burst transmission to provide a combined rate and TX antenna selection according to the received block acknowledgement, wherein switching between N TX antenna combinations during the HTP burst transmission is performed during a preamble of the HTP burst transmission.

2. The method of claim 1, wherein switching between the TX antenna combinations further comprises:
   transmitting a burst of frames; and
   toggling between the N TX antenna combinations after each predetermined number of frames.

3. The method of claim 1, wherein analyzing comprises:
   determining a packet error rate for each TX antenna combination; and
   selecting a TX antenna combination with the lowest packet error rate.

4. The method of claim 1, further comprising:
determining a lowest packet error rate according to the received block acknowledgement;
increasing the TX rate if the lowest packet error rate is less than a threshold packet error rate; and
decreasing the TX rate if the lowest packet error rate is greater than a threshold packet error rate.

5. The method of claim 1, wherein HTP burst transmission includes a sequence of frames including a physical layer convergence procedure protocol data unit followed by a reduced inter-frame space.

6. The method of claim 1, wherein a mechanism to generate the block acknowledgement comprises aggregating several acknowledgements into a single frame, wherein the several acknowledgements are associated with each frame transmitted as part of the HTP burst transmission.

7. The method of claim 1, wherein the HTP burst transmission occurs after whether a Quality of Service (QoS) change or rate scaling change is requested.

8. An article of manufacture comprising a non-transitory computer-readable storage medium storing a program having computer-executable instructions having associated data, wherein the data, when accessed, enables a processor to:
transmit a burst of frames as a single data unit;
switch, during transmitting the burst of frames, between N transmission (TX) antenna combinations, where N is an integer; and
select a TX rate and a TX antenna combination of M antennas, where M is an integer less than N, according to a block acknowledgement received for the burst of frames to provide a combined rate and TX antenna selection according to the received block acknowledgement, wherein the block acknowledgement comprises at least one of:
at least one immediate block acknowledgement message suitable for high-bandwidth, low latency traffic; and
at least one delayed block acknowledgement message suitable for moderate latency, wherein the processor to switch between N TX antenna combinations during a preamble of high throughput (HTP) burst transmission.

9. The article of manufacture of claim 8, wherein transmitting the burst of frames enables a further operation of:
HTP burst transmission with a time gap after each predetermined number of frames.

10. The article of manufacture of claim 8, wherein switching the TX antenna combination enables a further operation of:
toggling between N TX antenna combinations, such that frames are transmitted with M TX antennas.

11. The article of manufacture of claim 8, wherein selecting the TX rate and the TX antenna combination enables a further operation of:
determining a packet error rate (PER) for each TX antenna combination; and
selecting a TX antenna combination with a lowest PER.

12. The article of manufacture of claim 11, wherein the machine readable medium further comprises data, which when accessed, enables a further operation of:
increasing a TX rate if the lowest PER is less than a threshold PER; and
decreasing the TX rate if the lowest PER is greater than a threshold PER.

13. An apparatus comprising:
a communications interface coupled to a plurality of transmission (TX) antennas; and
a chipset coupled to the communications interface, the chipset including TX antenna selection logic to switch between N TX antenna combinations during a high-throughput (HTP) burst transmission, wherein the chipset to switch between N TX antenna combinations during a preamble of the HTP burst transmission, wherein N is an integer, wherein the chipset to:
select a TX antenna combination according to a block acknowledgement (ACK) received for the HTP burst transmission, wherein the block acknowledgement comprises at least one of: immediate block ACK message suitable for high-bandwidth, low latency traffic, and delayed block ACK message suitable for moderate latency, and
adjust a TX rate according to the block acknowledgement received for the HTP burst transmission to provide a combined rate and TX antenna selection according to the received block acknowledgement, where the HTP burst transmission aggregates two or more frames as a single data unit.

14. The apparatus of claim 13, wherein the chipset further comprises:
quality of service (QoS) logic to direct the TX antenna selection logic to select a new TX antenna combination responsive to a predetermined QoS level.

15. The apparatus of claim 13, wherein the chipset further comprises:
rate scale logic to determine a packet error rate according to the pattern of the received block acknowledgement and to select a TX rate according to a packet error rate determined from the received block acknowledgement.

16. The apparatus of claim 13, wherein the TX antenna selection logic further comprises:
packet error rate logic to determine a packet error rate for each TX antenna combination according to the received block acknowledgement; and
compare logic to identify a TX antenna combination with the lowest packet error rate.

17. The apparatus of claim 13, wherein the communications interface further comprises:
a physical layer (PHY) device to transmit a burst of frames with a time gap after each N-frames, where N is an integer greater than one; and
toggle logic to switch the TX antenna combination during each time gap.

18. A system comprising:
a station including:
a communications interface for communicating with an access point of a local area network (LAN);
a plurality of (N) dipole antennas coupled to the interface, where N is an integer greater than one; and
a chipset coupled to the interface, the chipset including quality of services (QoS) logic to direct transmission (TX) antenna selection logic to:
switch between a plurality of (N) TX antenna combinations during a high-throughput (HTP) burst transmission, where the HTP burst transmission aggregates two or more frames as a single data unit, wherein the selection logic to switch between N TX antenna combinations during a preamble of the HTP burst transmission,
analyze a block acknowledgement received for the HTP transmission to select a TX antenna combination of a plurality of (M) TX antennas to provide a QoS level, where M is an integer less than N, wherein the block acknowledgement comprises at least one immediate block ACK message suitable for high-bandwidth, low latency traffic and at least one delayed block ACK message suitable for moderate latency, and adjust a TX rate according to the block acknowledgement received for the HTP burst transmission to provide a combined rate and TX antenna selection according to the received block acknowledgement.

19. The system of claim 18, wherein the QoS logic further comprises:

rate scale logic to determine a packet error rate according to the received block acknowledgement, the rate scale logic to scale a TX rate according to a packet error rate determined from the block acknowledgement in a prior packet error rate.

20. The system of claim 18, wherein the communications interface further comprises:

a physical layer (PHY) device to transmit a burst of frames with a time gap after each N-frames; and toggle logic to switch, during each time gap, the TX antenna combination, such that the burst of frames are transmitted with different TX antenna combinations.

21. The system of claim 18, wherein the TX antenna selection logic further comprises:

packet error rate logic to determine a packet error rate for each TX antenna combination according to the received block acknowledgement; and comparison logic to select a TX antenna combination having a lowest packet error rate.

22. The system of claim 18, wherein the QoS logic is to perform the HTP burst transmission prior to modification of a TX rate.

* * * * *